US007664968B2

(12) United States Patent
Bahali et al.

(10) Patent No.: US 7,664,968 B2
(45) Date of Patent: Feb. 16, 2010

(54) SYSTEM AND METHOD FOR MANAGING POWER USAGE OF A DATA PROCESSING SYSTEM SUBSYSTEM

(75) Inventors: Sumanta K. Bahali, Cary, NC (US); Warren D. Bailey, Pittsboro, NC (US); Jimmy G. Foster, Sr., Morrisville, NC (US); Gregory D. Sellman, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 379 days.

(21) Appl. No.: 11/148,580

(22) Filed: Jun. 9, 2005

(65) Prior Publication Data

US 2006/0282686 A1   Dec. 14, 2006

(51) Int. Cl.
*G06F 1/32* (2006.01)
*G06F 3/00* (2006.01)

(52) U.S. Cl. .................. 713/300; 713/320; 713/323; 713/330; 710/58; 710/310

(58) Field of Classification Search .................. 713/300, 713/320, 323, 330; 710/58, 310
See application file for complete search history.

(56) References Cited

U.S. PATENT DOCUMENTS

| | | | |
|---|---|---|---|
| 5,249,297 A * | 9/1993 | Brockmann et al. ......... 710/105 |
| 5,251,320 A | 10/1993 | Kuzawinski et al. |
| 5,307,409 A | 4/1994 | Driscoll |
| 5,398,244 A * | 3/1995 | Mathews et al. ............ 370/448 |
| 5,483,656 A | 1/1996 | Oprescu et al. |
| 5,579,524 A | 11/1996 | Kikinis |
| 5,652,893 A | 7/1997 | Ben-Meir et al. |
| 5,719,800 A | 2/1998 | Mittal et al. |
| 5,724,592 A | 3/1998 | Garner |
| 5,752,050 A | 5/1998 | Hernandez et al. |
| 5,764,913 A | 6/1998 | Jancke et al. |
| 5,787,294 A | 7/1998 | Evoy |
| 5,987,614 A | 11/1999 | Mitchell et al. |
| 6,029,006 A | 2/2000 | Alexander et al. |
| 6,266,735 B1 | 7/2001 | Isobe |
| 6,301,527 B1 | 10/2001 | Butland et al. |
| 6,377,874 B1 | 4/2002 | Ykema |
| 6,397,287 B1 * | 5/2002 | Brown et al. ................. 710/305 |
| 6,477,483 B1 | 11/2002 | Scarlat et al. |
| 6,525,895 B2 | 2/2003 | Wakui |
| 6,564,274 B1 | 5/2003 | Heath et al. |
| 6,564,328 B1 | 5/2003 | Grochowski |
| 6,564,332 B1 | 5/2003 | Nguyen et al. |
| 6,643,771 B2 | 11/2003 | Tsushima et al. |
| 6,701,446 B2 | 3/2004 | Tsern et al. |
| 6,708,278 B2 | 3/2004 | Howard et al. |

(Continued)

*Primary Examiner*—Thomas Lee
*Assistant Examiner*—Michael J Brown
(74) *Attorney, Agent, or Firm*—Cynthia G. Seal; Law Office of Jim Boice (57) ABSTRACT

A power-managed server data processing system comprises a bus configured to communicatively couple a power-managed server with a data processing system resource and a bus controller coupled to the bus. The bus controller comprises bus control logic configured to process a plurality of access requests associated with the bus, and power management logic configured to inhibit processing of a current access request of the plurality of access requests by the bus control logic for a power management delay time period. The power management delay time period is determined utilizing a processing latency time period associated with a prior access request of the plurality of access requests.

15 Claims, 6 Drawing Sheets

U.S. PATENT DOCUMENTS

| | | |
|---|---|---|
| 6,711,649 B1 * | 3/2004 | Bachmat et al. ............. 711/114 |
| 6,802,014 B1 | 10/2004 | Suurballe |
| 6,836,849 B2 | 12/2004 | Brock et al. |
| 6,915,438 B2 * | 7/2005 | Boros ........................ 713/322 |
| 6,931,553 B1 | 8/2005 | Plante et al. |
| 2002/0007463 A1 | 1/2002 | Fung |
| 2002/0062454 A1 | 5/2002 | Fung |
| 2003/0037268 A1 | 2/2003 | Kistler et al. |
| 2003/0055969 A1 | 3/2003 | Begun et al. |
| 2003/0061448 A1 | 3/2003 | Rawson, III |
| 2003/0065961 A1 | 4/2003 | Koenen |
| 2003/0131119 A1 | 7/2003 | Noonan et al. |
| 2005/0102544 A1 | 5/2005 | Brewer et al. |
| 2007/0005994 A1 | 1/2007 | Bahali et al. |

* cited by examiner

SYSTEM AND METHOD FOR MANAGING POWER USAGE OF A DATA PROCESSING SYSTEM SUBSYSTEM

CROSS-REFERENCE TO RELATED APPLICATIONS

The present application is related to the following United States Patent Applications, which are assigned to the assignee hereof and incorporated herein by reference in their entireties and for all purposes:

U.S. patent application Ser. No. 11/148,579, entitled, "DISTRIBUTED SYSTEM AND METHOD FOR MANAGING POWER USAGE AMONG SERVER DATA PROCESSING SYSTEMS," naming Sumanta K. Bahali, Warren D. Bailey, Jimmy G. Foster, Sr., and Gregory D. Sellman as joint inventors, and filed concurrently herewith.

U.S. patent application Ser. No. 11/148,692, entitled, "POWER MANAGEMENT SERVER AND METHOD FOR MANAGING POWER CONSUMPTION," naming Sumanta K. Bahali, Warren D. Bailey, Jimmy G. Foster, Sr., and Gregory D. Sellman as joint inventors, and filed concurrently herewith.

U.S. patent application Ser. No. 11/148,581, entitled, "POWER-MANAGED SERVER AND METHOD FOR MANAGING POWER CONSUMPTION," naming Sumanta K. Bahali, Warren D. Bailey, Jimmy G. Foster, Sr., and Gregory D. Sellman as joint inventors, and filed concurrently herewith.

U.S. patent application Ser. No. 11/148,934, entitled, "HIERARCHICAL SYSTEM AND METHOD FOR MANAGING POWER USAGE AMONG SERVER DATA PROCESSING SYSTEMS," naming Sumanta K. Bahali, Warren D. Bailey, Jimmy G. Foster, Sr., and Gregory D. Sellman as joint inventors, and filed concurrently herewith.

BACKGROUND

1. Technical Field

Embodiments of the present invention relate generally to power allocation within a data processing system and more particularly to a method and system for managing power usage of a data processing system subsystem.

2. Description of the Related Art

Recently, the development of data processing systems (e.g., computer systems) has begun to focus on the amount of electrical power consumed rather than solely on more traditional aspects such as the volume of data stored, the speed at which operations are completed, or the flexibility of the types of operations which may be performed. This is true not only in the context of mobile data processing system devices where the weight and charge/discharge cycle time of portable power sources such as battery cells is critical, but also in the context of desktop or large data processing systems not intended to be user-portable.

In the larger data processing system context, a reduction in power usage or consumption may be necessary to achieve eligibility for certain environmental impact standards or labels such as the "Energy Star" rating system established by the United States Department of Energy and the Environmental Protection Agency or merely to reduce the cost of operating a data processing system associated with system power. The issue of power management is even more critical in larger scale data processing systems such as supercomputers, parallel processing data processing systems (e.g., massively parallel processing systems), server data processing system "farms", and rack servers.

A rack server is a data processing system including a storage rack element into which one or more server data processing system modules are inserted. In a typical configuration, a single power input or source (e.g., a conventional wall-mounted power outlet) is coupled to each storage rack element with power being distributed or subdivided among the elements of the rack as needed (e.g., via a power distribution unit or "PDU").

The available space of a rack server is typically defined in terms of rack units or "U" with storage rack elements being available in a variety of sizes (e.g., 14U, 25U and 42U). Conventional server data processing system modules are measured in terms of the number of rack units they occupy, with rack density being determined by the number of "U" occupied within a storage rack element. Until recently, a conventional rack server would include a 42U rack having 6 7U-sized server data processing system modules. More modem rack servers may frequently include 21 2U-sized server data processing system modules, 42 1U-sized server data processing system modules, or even 84 half rack unit-sized or "blade" server data processing system modules.

Each server data processing system module typically includes a separate power supply element and consequently, as the number of modules in a rack server increases, the amount of power consumed may increase disproportionately as compared with a rack server including a smaller number of larger modules. Electrical power usage in such power-dense rack servers may be so great that a single power input/source, server farm, or data center may be unable to provide sufficient power to operate all modules as needed.

In a conventional data processing system, power management is frequently accomplished by reducing rail or source voltages applied to a processing element (e.g., a central processing unit) or the frequency of a clock signal applied to such a processing element in response to a user selection of a particular power "mode" (e.g., maximum system performance or minimum power usage mode) or following the detection of an external event such as the application or removal of an external (e.g., alternating current) power source. In still other conventional data processing systems, power management is achieved by deactivating system elements, for example, by detecting inactivity of an element and responsively deactivating it until activity resumes or redistributing processing or storage loads among redundant system elements and deactivating those elements which are no longer being used.

While such power management techniques may result in a reduction in the amount of power consumed, they suffer from number of shortcomings. Explicit user input may not accurately reflect the power usage needs of a data processing system affected. Similarly, power management operations keyed to operate in response to environmental factors alone (e.g., the connection or disconnection of an external power source) may provide insufficient processing capability while satisfying a data processing system's power budget. On-demand systems, which deactivate unused elements in an attempt to satisfy both electrical and processing power requirements, frequently suffer a degree of latency between transitions, resulting in an inappropriate amount of processing and/or electrical power being used or available. Moreover, such power management techniques provide no manner to coordinate the power usage of multiple data processing systems which depend on a single power input or source or to layer or integrate multiple power management entities or processes.

SUMMARY

A system and method are provided herein for managing power usage of a data processing system subsystem. According to one embodiment, a power-managed server data processing system is provided which comprises a bus configured to communicatively couple a power-managed server with a data processing system resource; and a bus controller coupled to the bus. In the described embodiment, the bus controller comprises bus control logic configured to process a plurality of access requests associated with the bus, and power management logic configured to inhibit processing of a current access request of the plurality of access requests by the bus control logic for a power management delay time period. The power management delay time period is determined utilizing a processing latency time period associated with a prior access request of the plurality of access requests.

The foregoing is a summary and thus contains, by necessity, simplifications, generalizations and omissions of detail; consequently, those skilled in the art will appreciate that the summary is illustrative only and is not intended to be in any way limiting. As will also be apparent from the accompanying description, the operations disclosed herein may be implemented in a number of ways including implementation in hardware, software, firmware, or a combination thereof, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous features and advantages made apparent to those skilled in the art by referencing the accompanying drawings in which.

The use of similar reference symbols in different drawings is intended to indicate similar or identical items.

DETAILED DESCRIPTION OF AN ILLUSTRATIVE EMBODIMENT

The following sets forth a detailed description of at least the best contemplated mode for carrying out the one or more systems, devices and/or processes described herein. The description is intended to be illustrative and should not be taken to be limiting. In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment," "an embodiment," or "embodiments" are intended to indicate that a particular feature, structure, or characteristic described in connection with the embodiment is included in at least one embodiment of the present invention. The appearance of such phrases in various places within the specification are not necessarily all referring to the same embodiment, nor are separate or alternative embodiments mutually exclusive of other embodiments. Moreover, various features are described which may be exhibited by some embodiments and not by others. Similarly, various requirements may be described which are applicable to some embodiments but not other embodiments.

Embodiments of the present invention provide a method and system for managing power usage of a data processing system subsystem. Invention embodiments may also be utilized to control or manage power usage among a group of plurality of server data processing systems, for example, on an individual server data processing system level, a group level, or a combination thereof. As all server data processing systems of a group sharing a single power input or source do not typically consume the maximum rated or required quantity of power substantially simultaneously, embodiments of the present invention enable servers of a group (e.g., a rack, server farm, or data center) of server data processing systems to be supplied with significantly less power than the maximum configuration would require, while preserving application performance on all member or component server data processing systems. Within the present description, the term "power" is intended to indicate electrical power or data or a factor which represents or specifies electrical power or is proportional to electrical power (e.g., current, voltage, duty cycle, or the like).

According to one embodiment of the present invention, a power-managed server data processing system is provided which comprises a bus configured to communicatively couple the power-managed server data processing system with a data processing system resource and a bus controller coupled to the bus. A bus controller may comprise any element, embodied in hardware, software, or a combination thereof which is used to manage utilization of a data processing system bus or similar communication medium. A bus controller directs traffic, arbitrates access to, or "masters" an associated bus and/or one or more resources coupled to the bus. A bus controller may therefore comprise any of a number of data processing system or computer controllers such as a memory controller or hub or an input/output controller or hub (e.g., a display controller or adapter, a storage controller, a super input/output controller, a host bus adapter, communications network adapter, or the like).

According to one embodiment of the present invention, a bus controller as previously described comprises a number of logic or functional elements which are configured to provide functionality and/or perform process operations as described herein. The term "logic" used herein, is intended to indicate any of a variety of data processing elements or modules including storage elements coupled with software, discrete or programmable hardware elements, or a combination thereof. In one embodiment, a bus controller comprises bus control logic configured to process a plurality of access requests associated with the bus and power management logic configured to inhibit processing of a current access request by the bus control logic for a power management delay time period. The power management delay time period being determined utilizing a processing latency time period associated with a prior access request. In other embodiments, such logic may be integrated into a smaller number of elements or further divided among a greater number of (e.g., logical, computational, or storage) elements.

In another embodiment, a system management processor is included within a power-managed server data processing system as previously described. In operation, the system management or "service" processor communicates with the bus controller, for example, by causing data specifying a power management level to be stored in a storage element of the bus controller. Whether or not (and/or for how long) the bus controller's power management logic is utilized to inhibit processing of a current access request may depend on, inter alia, the specified power management level. More specifically, in one embodiment, a bus controller within a power-managed server data processing system comprises a power management control register which is dynamically accessible by an associated system management processor. Data specifying a power management level to be assumed may then be dynamically written or otherwise caused to be stored within the power management register by the system management processor.

In alternative embodiments of the present invention, any of a number of techniques or processes may be utilized to determine or select a next power management level. A power management level (and consequently a power usage or consumption level or state) of a server data processing system may be utilized to select which power management operations or commands are performed and/or the frequency with which such operations are performed. Power management level may be selected based upon any of a number of factors, criteria, or system attributes (e.g., power usage or consumption as compared to a pre or dynamically determined power usage threshold, a server data processing systems thermal state, processing load, external events or triggers, explicit user specification, or the like). Power management (e.g., a power management level) may also be implemented based upon factors, criteria, or attributes at various levels of granularity within a data processing system (e.g., at a remote power management and/or local power-managed server data processing system level, a global data processing system, power management group, or communications network level, and/ or at a level including a subset of elements of a such a system, group, or network).

According to one embodiment of the present invention, power management as described herein is implemented in the context of data processing system memory subsystem. More specifically, power-managed server data processing system is provided which comprises a data processing system resource (e.g., a system or "main" memory element) which is coupled to the system via a local or "system" bus (e.g., a memory bus). A bus controller as described herein in the context of the described memory subsystem embodiment comprises a memory controller.

A register is provided in the memory controller which is dynamically accessible to an associated system management processor, having at least write access. This "power management" register may be utilized to control utilization of the memory bus in order to reduce memory subsystem power usage. As a memory subsystem is one of the most-frequently used portions of a data processing system, excursions of power consumption may be effectively and consistently restricted at the system level utilizing the described memory subsystem embodiment.

In one embodiment of the present invention, the power management register is utilized to store data specifying one of a number of predefined power management or power usage reduction levels. In the described embodiment, power management is quantized into a number of predefined power management or "throttling" zones or levels. While the number, spacing, and definition of such power management levels may be arbitrarily established, power management levels are defined in one embodiment in 5 percent increments from 100 to 60 percent of the peak rated power usage of each element (e.g., server data processing system) of a power management group.

As one example, when the power management register is programmed with or caused to store data specifying a power management or usage reduction level of 20 percent, an associated memory controller will delay the issue or "grant" of 1 of every 5 memory cycle access requests for a total power management delay time equal to or greater than the duration of the previous access from start to completion (e.g., the time used to process an access request immediately preceding the access request to be delayed). Alternatively, a issuance delay equal to the average completion time of a predetermined number (e.g., four) of previous memory accesses may be implemented. Where data specifying a power management level corresponding to a 40 percent power usage reduction is stored within the "power management" register, the memory controller will responsively delay the issue of two of every five memory access cycles or access requests.

An associated system management processor is then utilized to track the power usage level at the server data processing system power supply as well as at the memory subsystem and to issue appropriate commands to restrict access to the memory bus. As a result, power usage is restricted in the memory subsystem as well as at the data processing system level, protecting both system memory and the server system as a whole.

According to another embodiment of the present invention, power management as described herein is implemented in the context of data processing system input-output (I/O) subsystem. More specifically, power-managed server data processing system is provided which comprises a data processing system resource (e.g., a data processing system I/O element) which is coupled to the system via an I/O or "expansion" bus such as a Peripheral Component Interconnect (PCI) bus (e.g., a PCI, PCI-X, PCI-E bus), an Accelerated Graphics Port (AGP) bus, an Industry Standard Architecture (ISA) bus, an Enhanced Industry Standard Architecture (EISA) bus, a Micro Channel Architecture (MCA) bus, or VESA Local (VL) Bus, or the like. A bus controller as described herein in the context of the described I/O subsystem embodiment comprises an I/O bridge arbitration control point (ACP). In one or more embodiments of the present invention, a server data processing system may comprise multiple such arbitration control points distributed in various expansion or I/O bridge chips, controller, or hubs.

A register is provided in the I/O controller or ACP which is dynamically accessible to an associated system management processor, having at least write access. This "power management" register may be utilized to control utilization of an attached I/O bus, reducing I/O bus bandwidth by a predetermined amount in order to reduce I/O subsystem power usage.

While exemplary embodiments described herein refer to a single power management register and a single I/O controller or ACP, such embodiments should be taken as illustrative rather than exhaustive and it should be appreciated that other embodiments are not so limited.

As one example, when the power management register is programmed with or caused to store data specifying a power management or usage reduction level of 20 percent, an associated I/O controller will delay the issue or "grant" of 1 of every 5 I/O access requests for a total power management delay time equal to or greater than the duration of the average time of the previous 4 arbitration cycles or accesses on an associated I/O bus. Where data specifying a power management level corresponding to a 40 percent power usage reduction is stored within the "power management" register, the I/O controller will responsively delay the issue of two of every five access cycles or requests. An associated system management processor is then utilized to track the power usage level at the server data processing system power supply as well as at the I/O subsystem and to issue appropriate commands to restrict access to one or more I/O busses.

Figure 1A:
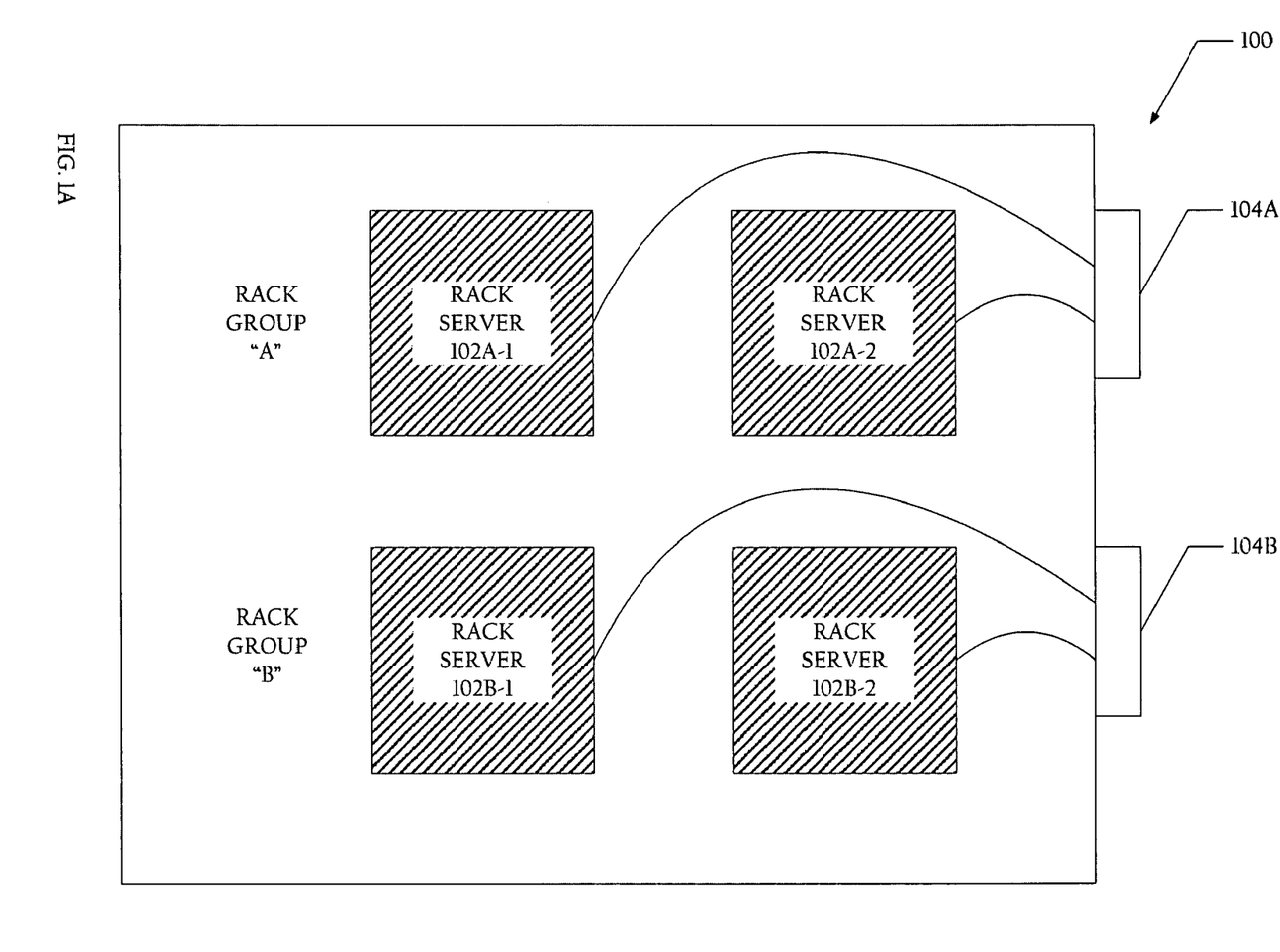
FIG. 1A is a plan view of a server farm including a plurality of rack servers as set forth in one or more embodiments of the present invention.

According to one embodiment of the present invention, a method and power-managed server data processing system as described herein is implemented within the context of a group or plurality of server data processing systems. More specifically, in one embodiment a power-managed server data processing system as described herein may be implemented as a server data processing system module of a rack server data processing system (e.g., within a server farm). FIG. 1A is a plan view of the server farm including a plurality of rack servers as set forth in one or more embodiments of the present invention. As shown from above, server farm 100 of the illustrated embodiment of FIG. 1A includes a number of "rack groups" (e.g., rack groups "A" and "B") each including a number of rack servers 102. Rack group "A" of the depicted embodiment includes rack servers 102A-1 and 102A-2 each coupled to a corresponding power source 104A. Similarly, rack group "B" of the depicted embodiment includes rack servers 102B-1 and 102B-2 each coupled to corresponding power source 104B. While a particular number and configuration of rack servers has been shown in FIG. 1A for illustrative purposes, in alternative embodiments of the present invention any number of rack servers (or other groups of server data processing systems), rack groups, and power sources may be implemented.

Figure 1B:
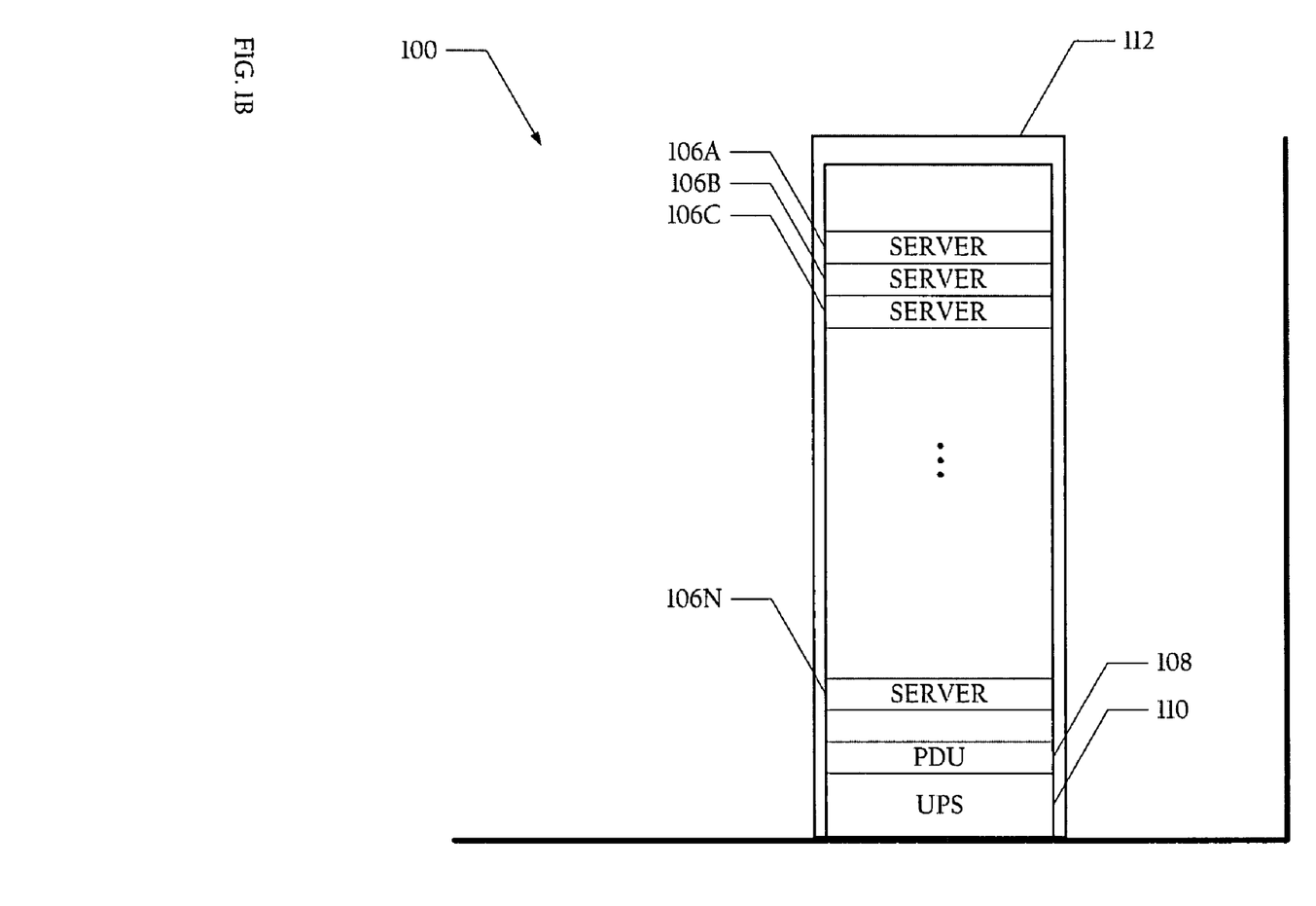
FIG. 1B is a front elevation view of a rack server of FIG. 1A.

FIG. 1B is a front elevation view of a rack server, such as rack server 102A-1 of FIG. 1A. The depicted rack server includes a plurality of server data processing systems (e.g., server data processing system modules 106A . . . 106N as shown) as well as a power distribution unit (PDU) 108 and an uninterruptible power supply (UPS) 110 disposed within a storage rack element 112. In the illustrated embodiment, server data processing system modules 106, PDU 108, and UPS 110 may be coupled with one another utilizing one or more connection media (not illustrated) within storage rack element 112. In alternative embodiments, power distribution among server data processing system modules 106A . . . 106N may be accomplished without the use of PDU 108 or UPS 110. Similarly, additional elements (e.g., input/output devices such as displays or keyboards, cooling devices, or the like) may be included within a rack server in other embodiments of the present invention.

Power distribution among server data processing system modules 106 is accomplished in the illustrated embodiment by coupling UPS 110 to a power supply (e.g., power source 104A of FIG. 1A) as well as to PDU 108. PDU 108 of the depicted embodiment is then in turn coupled to each of server data processing system modules 106A . . . 106N. According to one embodiment, all elements (e.g., server data processing system modules) coupled to a single power supply compose a power management group.

According to one embodiment of the present invention, a power-managed server data processing system as described herein is coupled, via a communication medium or link and power management communication port(s) with a power-management server data processing system of an associated power management group. Commands to perform one or more power management operations (e.g., to assume a predefined power management level) may then be communicated between server data processing systems of the power management group at various levels of granularity. For example, such commands may be issued at the rack level to protect or limit electrical power provided to a rack server data processing system.

In one embodiment, if a power-managed server data processing system as described herein is self-regulating or managing power usage (e.g., by issuing power management commands internally) and an associated power-management server data processing system is requesting (via power management commands) an additional reduction of power usage in parallel these power management commands or operations may be combined up to a maximum power usage reduction or power management level threshold (e.g., 40 percent of peak rated power). For example, the power-managed server data processing system may command or request the sum of two corresponding power usage reductions to a managed subsystem. Consequently, if a power-managed server data processing system requested a 5 percent power usage reduction at a subsystem level and a power management server data processing system issued a request at the group or rack level for an additional 5 percent reduction, the power-managed server data processing system may, in one embodiment, command a 10 percent reduction of subsystem power.

Although a group or plurality of server data processing systems have been described herein primarily as server data processing system modules within the context of a rack server, embodiments of the present invention are not limited to use in conjunction with rack servers or component modules thereof. For example, in alternative embodiments of the present invention, a group or plurality of server data processing system may comprise one or more free-standing, enclosed server data processing systems or a combination of free-standing, enclosed server data processing systems and server data processing system modules of a rack or blade server. According to one embodiment, a plurality of group of server data processing systems is defined by coupling to a particular power input or source (e.g., a wall outlet, a power line/link, a power substation, or the like). Moreover, embodiments of the present invention need not be implemented in the context of a group of data processing systems but rather may be practiced in the context of a standalone data processing system.

Figure 2:
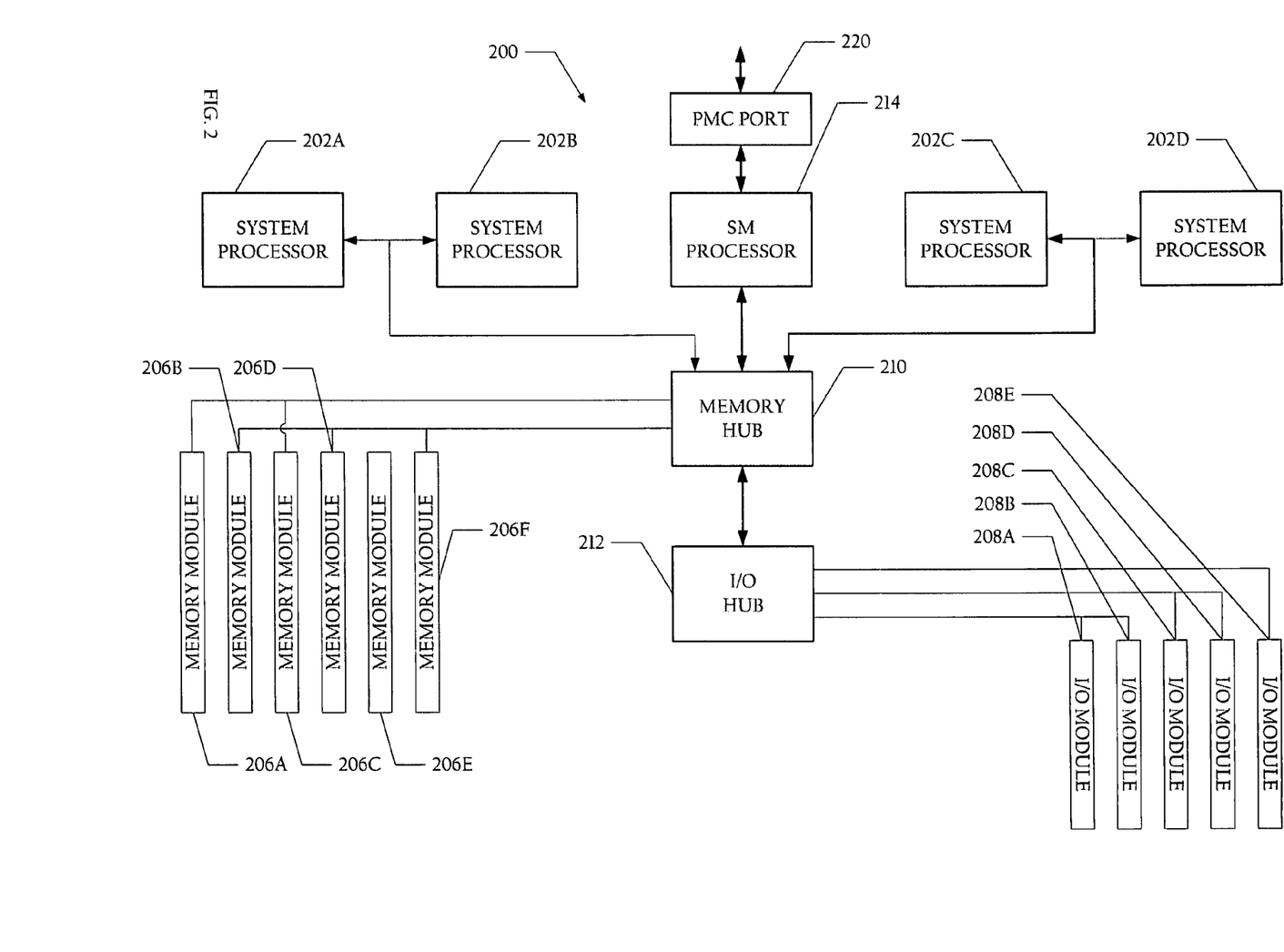
FIG. 2 is a high-level internal block diagram of a server data processing system according to an embodiment of the present invention.

FIG. 2 is a high-level internal block diagram of a server data processing system module according to an embodiment of the present invention. With reference to FIG. 2, a more detailed description of the internal components of a server data processing system module such as a component server data processing system module 106 of rack server 102A-1 of FIG. 1A is provided. While a particular number and arrangement of elements has been illustrated with respect to server data processing system module 200 of FIG. 2, it should be appreciated that embodiments of the present invention are not limited to data processing systems having a particular number, type, or arrangement of components and so may encompass a wide variety of data processing system types, architectures, and form factors (e.g., network elements or nodes, personal computers, workstations, servers, or the like).

Server data processing system module 200 of the depicted embodiment includes a number of system processors 202A . . . 202D and a system management processor 214 coupled to memory modules 206A . . . 206F and input/output (I/O) modules 208A . . . 208E via a memory controller 210 or hub and an I/O controller 212 or hub as shown. In the illustrated embodiment, a memory bus includes a communication medium coupled between one or more of memory modules 206A . . . 206F and at least one other element (e.g., a system processor 202 and/or service management processor 214) of the depicted server data processing system module. Similarly, an I/O bus includes a communication medium coupled between one or more of I/O modules 208A . . . 208E and at least one other server data processing system module element. In other embodiments, a bus (e.g., a memory or I/O bus) may also include supporting logic coupled therewith. Server data processing system module 200 of the illustrated embodiment further includes a power management communication port 220 as described further herein.

Memory (not illustrated) coupled with one or more of memory modules 206A . . . 206F may comprise any of a number of system memory-type storage elements such as random access memory (RAM), read-only memory (ROM), flash memory, and cache. Similarly, an I/O device (not illustrated) coupled with one or more of I/O modules 208A . . . 208E may include traditional I/O devices such as keyboards, displays, printers, cursor control devices (e.g., trackballs, mice, tablets, etc.), speakers, and microphones; storage devices such as fixed or "hard" magnetic media storage devices, optical storage devices (e.g., CD or DVD ROMs), solid state storage devices (e.g., USB, Secure Digital SD™, CompactFlash™, MMC, or the like), removable magnetic medium storage devices such as floppy disks and tape, or other storage devices or mediums; and wired or wireless communication devices or media (e.g., communication networks accessed via modem or direct network interface).

Embodiments of the present invention may include software, data processing hardware, and various processing operations further described herein. The features and process operations of the present invention may be embodied in executable instructions embodied within a machine-readable medium such as a memory coupled with a memory module of memory modules 206A . . . 206F, a storage device, a communication device or medium, or the like. A machine-readable medium may include any mechanism that provides (i.e., stores and/or transmits) data in a form readable by a machine (e.g., server data processing system module 200). For example, a machine-readable medium may include but is not limited to: random access memory (RAM); read only memory (ROM); magnetic storage media; optical storage media; flash memory devices; or the like.

The described executable instructions can be used to cause a general or special purpose processor such as one or more of system processors 202A . . . 202D and/or system management processor 214, programmed with the instructions, to perform operations, methods or processes of the present invention. Alternatively, the features or operations of the present invention may be performed by specific hardware components that contain hard-wired logic for performing such operations, or by any combination of programmed data processing components and custom hardware components.

The present invention has been described in the context of fully functional data processing system; however, those skilled in the art will appreciate that the present invention is capable of being distributed as a program product in a variety of forms and of being applied equally, regardless of the particular type of machine-readable or signal-bearing media used to carry out the distribution. Examples of signal-bearing media include recordable media such as floppy disks and CD-ROM, as well as media storage and distribution systems. Embodiments of the present invention may similarly be implemented using software modules used to perform certain operations or tasks. The described software modules may include script, batch, library, or other executable files and may be stored on a machine- or computer-readable medium. Thus, the modules may be stored within a computer system memory to configure a data processing or computer system to perform one or more functions of a software module. Various types of machine or computer-readable storage media may be used to store the modules discussed herein.

Figure 3:
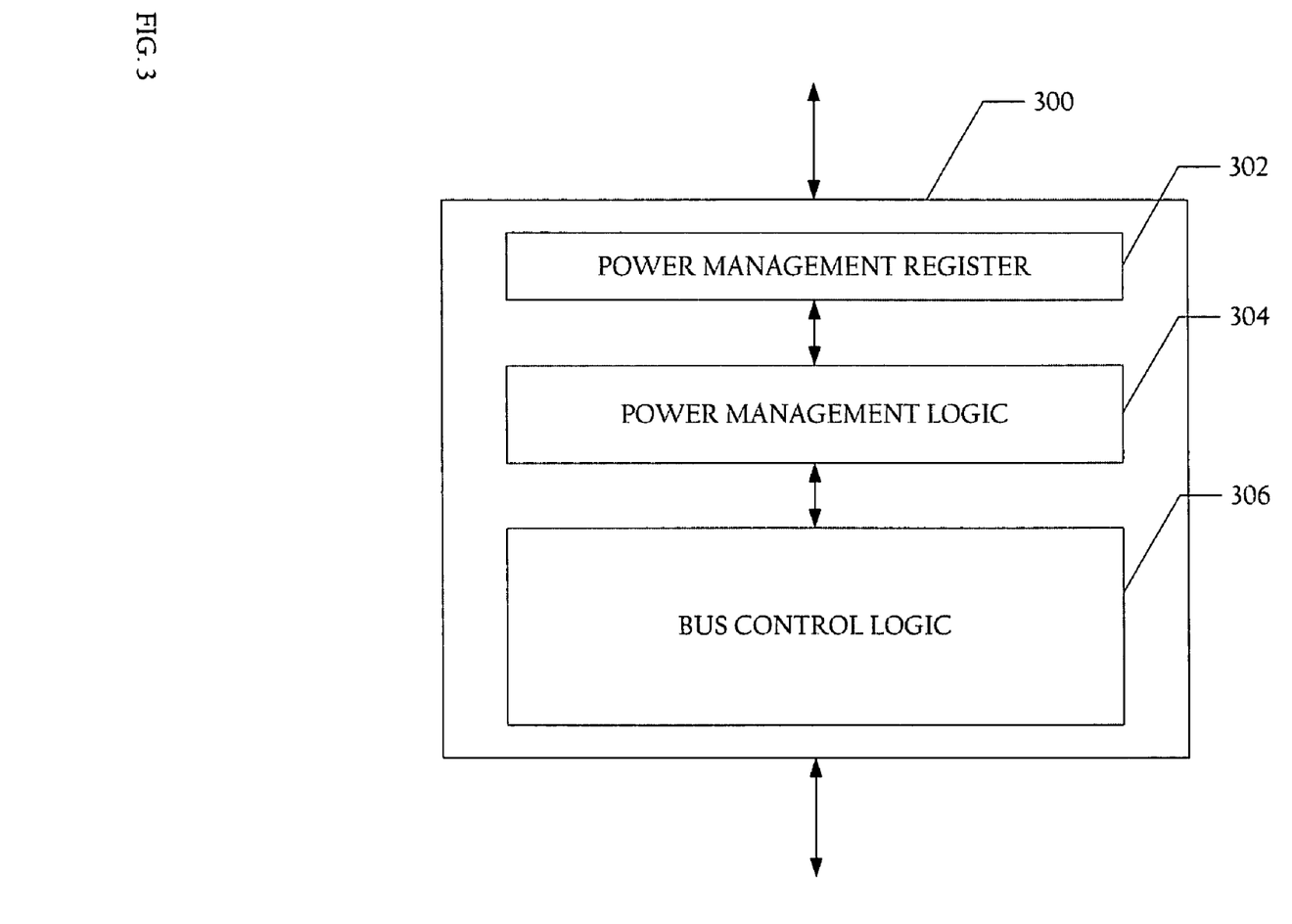
FIG. 3 is a high-level internal block diagram of a bus controller according to an embodiment of the present invention.

FIG. 3 is a high-level internal block diagram of a bus controller (e.g., memory controller 210 and/or I/O controller 212 of FIG. 2) according to an embodiment of the present invention. Bus controller 300 of the depicted embodiment includes a storage element (power management register 302) to store data specifying a power management level currently or to be assumed by an associated server data processing system or a subsystem thereof. Bus controller 300 further includes power management logic 304 and bus control logic 306 coupled together as shown in the illustrated embodiment. In operation, bus control logic 306 is configured to process access requests for access on or with an associated bus (e.g., a memory bus) and power management logic 304 is configured to inhibit processing of a current access request by the bus control logic for a power management delay time period. The power management delay time period is determined utilizing a processing latency time period associated with a prior access request of the plurality of access requests being processed.

While power management logic 304 and bus control logic 306 have been illustrated as distinct elements within the illustrated bus controller embodiment, in other embodiments the functionality or structure of such logic may be coalesced or combined or separated into additional elements. For example, in one particular embodiment such functionality is implemented as program code elements or modules within a general or special purpose processing element. Similarly, while a register (e.g., power management register 302) has been depicted, other volatile or non-volatile, sequential or direct access storage elements (e.g., random access memory, read-only memory, flash memory, and cache) are contemplated in alternative embodiments. In another embodiment of the present invention, bus controller 300 includes an additional storage element (not illustrated) to store processing latency time period data (e.g., data specifying a processing latency time period associated with an access request immediately preceding the current access request in time, an average processing latency time period of a number of access requests preceding the current access request in time, or the like).

Figure 4:
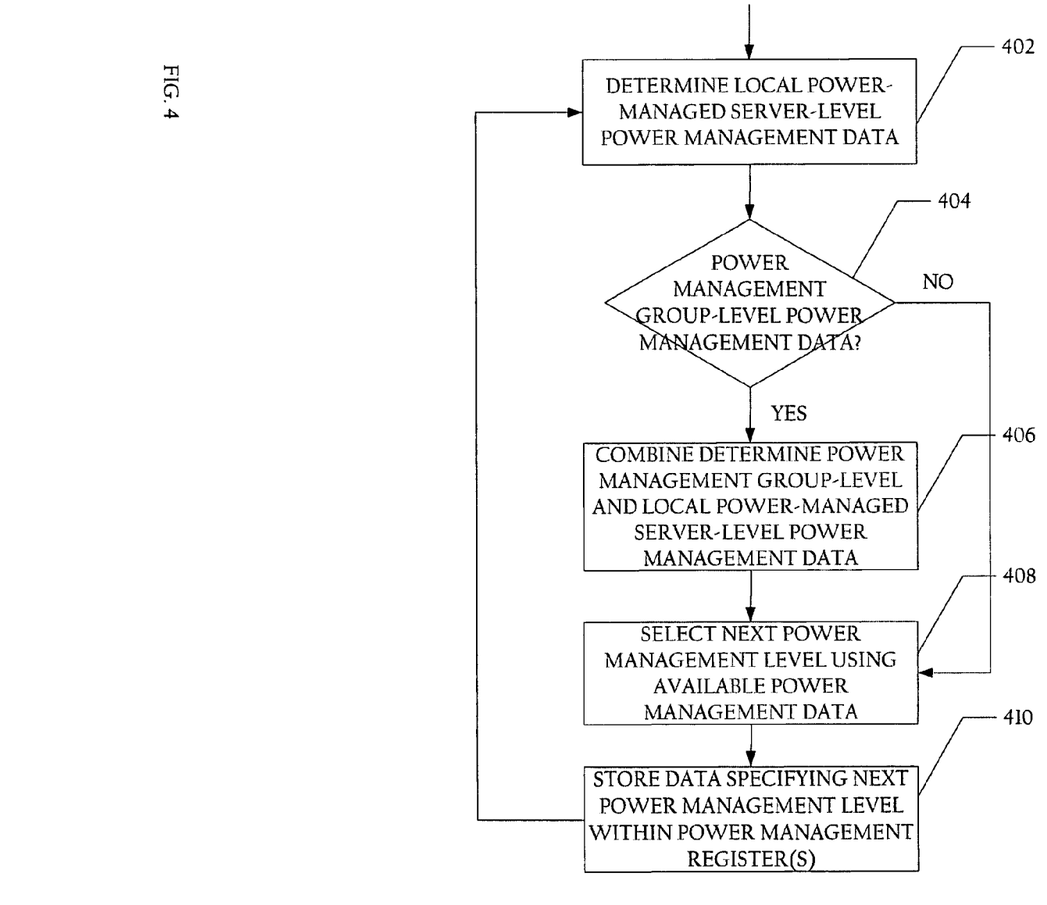
FIG. 4 illustrates a high-level flow diagram of a power management operational process of a system management processor according to an embodiment of the present invention.

FIG. 4 illustrates a high-level flow diagram of a power management operational process of a system management processor according to an embodiment of the present invention. In the illustrated process embodiment, power management data local to a power-managed server data processing system including the system management processor is initially determined (process block 402). Such power management data may comprise any data relevant to the management or regulation of server data processing system power consumption and in one embodiment includes data specifying a power management or usage reduction level or state to be assumed. In other embodiments such data may comprise data specifying a current power usage or consumption level and/or power usage threshold, power management capability data, data specifying a proportion or percentage of power (e.g., maximum required power) to which a corresponding power-managed server data processing system may regulate or "throttle" power consumption, or the like.

Once local power management data has been determined (e.g., via the receipt of data specifying such data from one or more elements of an associated server data processing system, a determination is made whether power management data of a power management group associated with a server data processing system including the system management processor implementing the depicted method is available (process block 404). If provided, the received group-level power management data is combined with the local server data processing system-level power management data (process block 406). In various embodiments of the present invention, such combination may take a variety of forms. For example, the combination of power management data may produce power management data specifying the most-restrictive power management data (e.g., the power management data corresponding to the greatest power usage reduction and/or most stringent power management level) of the two received sets of power management data.

Alternatively, such a combination may cause data specifying the least-restrictive power management data to be produced (e.g., in order to provide sufficient electrical, and consequently processing power, which may be needed to perform a particular task or process). In still other embodiments, other combination methods and/or results are contemplated (e.g., the summation of the total power to be conserved, an average, or the like). Once local and group-level power management data have been combined (process block 406), or alternatively if a determination is made that no group-level power management data has been received (process block 404), power management data is utilized to select the next power management state or level to be assumed by an associated data processing system or subsystem thereof (process block 408). Thereafter in the illustrated process embodiment data specifying the next power management level to be assumed is stored within a corresponding power management register or registers (process block 410) before the depicted process is repeated as shown.

Figure 5:
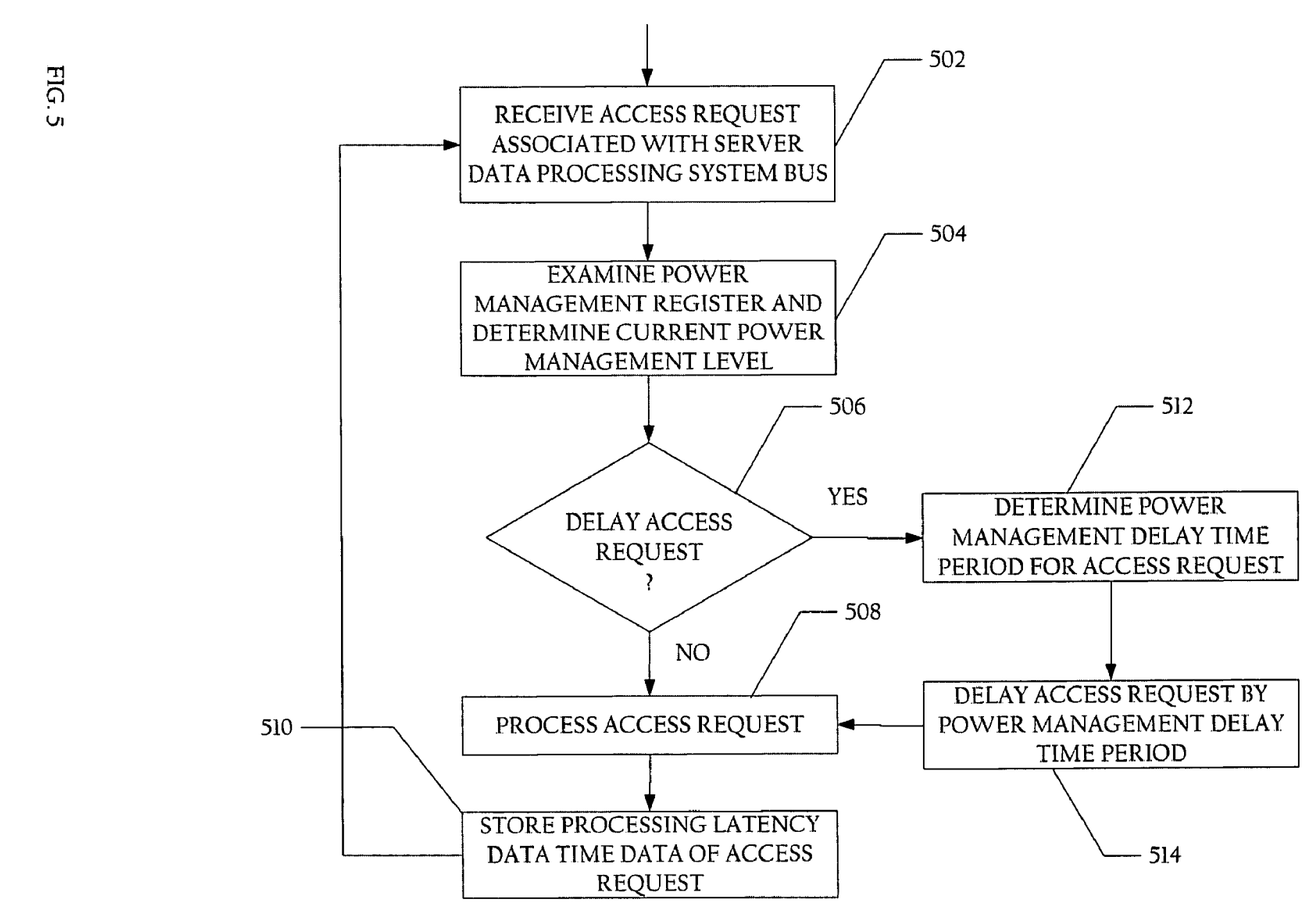
FIG. 5 illustrates a high-level flow diagram of a power management operational process of a bus controller according to an embodiment of the present invention.

FIG. 5 illustrates a high-level flow diagram of a power management operational process of a bus controller according to an embodiment of the present invention. In the depicted process embodiment, an access request is initially received which is associated with a (power-managed) server data processing system bus (process block 502). Thereafter, a power management register (e.g., within the bus controller performing the illustrated method embodiment) is examined to determine the current power management level (process block 504) of the associated server data processing system. Once determined, the current power management level is used to resolve whether or not the received access request is to be delayed (process block 506). If a determination is made that no delay is required, the received access request is processed (process block 508) and processing latency time data for the request is stored (process block 510) as shown. If a delay is determined to be required however, a power management delay time period is determined (process block 512) and used to delay the received access request (process block 514).

As previously described herein, variations may be made in different embodiments of the present invention. For example, processing latency time (e.g., data specifying an amount of time utilized by a bus controller to process one or more access requests) may take a variety of forms. Similarly, a power management delay time may be resolved using any of a number of techniques depending on the embodiment being implemented. While the processing of access requests has been depicted as being performed in a serial fashion, in other embodiments multiple access requests may be received and/or processed substantially simultaneously.

Although the flow diagrams depicted in FIGS. 4 and 5 indicate a particular order of operation and a specific granularity of process operations, in alternative embodiments the illustrated orders may be varied (e.g., process operations may be performed in another order or performed substantially in parallel) and one or more of the process operations may be coalesced or fragmented. Similarly, additional process operations may be added where necessary in alternative embodiments of the present invention. For example, in embodiments in which an average of prior processing latency time periods are used to determine a power management delay time, such prior processing latency time periods may be averaged as they are received, or alternatively stored (e.g., in a rolling or circular data structure or storage element) and averaged at the time an access request is to be delayed.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention.

Consequently, the invention is intended to be limited only by the scope of the appended claims, giving full cognizance to equivalents in all respects.

What is claimed is:

1. A method for managing power usage within a data processing system resource coupled with a power-managed server data processing system via a bus, said method comprising:

processing a plurality of access requests associated with said bus;

determining a processing latency time period associated with a prior access request of said plurality of access requests;

inhibiting processing of a current access request for a power management delay time period, wherein said power management delay time period is determined utilizing said processing latency time period, and wherein said data processing system resource comprises a data processing system input/output element, and said power management delay time period is determined utilizing an average processing latency time period associated with a predetermined number of access requests of said plurality of access requests preceding said current access request in time;

causing data specifying a power management level to be stored utilizing a storage element associated with said power-managed server data processing system; and inhibiting said processing of said current access request in response to said causing.

2. The method of claim 1, wherein said power-managed server data processing system comprising one of a plurality of server data processing systems, and said method further comprises one of a plurality of server data processing systems, and said method further comprises determining said data specifying said power management level in response to a receipt of a first power management command local to said power-managed server data processing system and a second power management command from a power management server data processing system of said plurality of server data processing systems.

3. The method of claim 1, wherein said plurality of access requests comprise a plurality of requests to access said data processing system resource utilizing said bus.

4. The method of claim 1, wherein said latency time period associated with said prior access request comprises a time period utilized to process said prior access request.

5. The method of claim 1, wherein said data processing system resource comprises a data processing system memory element, and said prior access request comprises access requests immediately preceding said current access request in time.

6. A system for managing power usage within a data processing system resource coupled with a power-managed server data processing system via a bus, said system comprising:
- a bus controller for processing a plurality of access requests associated with said bus;
- a system management processor for determining a processing latency time period associated with a prior access request of said plurality of access requests;
- a power management logic for inhibiting processing of a current access request for a power management delay time period, wherein said power management delay time period is determined utilizing said processing latency time period, and wherein said data processing system resource comprises a data processing system input/output element, and said power management delay time period is determined utilizing an average processing latency time period associated with a predetermined number of access requests of said plurality of access requests preceding said current access request in time;
- the bus controller causing data specifying a power management level to be stored utilizing a storage element associated with said power-managed server data processing system; and
- the power management logic inhibiting said processing of said current access request in response to said causing.

7. The system of claim 6, wherein said power-managed server data processing system comprises one of a plurality of server data processing systems, and the system further comprises means for determining said data specifying said power management level in response to a receipt of a first power management command local to said power-managed server data processing system and a second power management command from a power management server data processing system of said plurality of server data processing systems.

8. The system of claim 6, wherein said plurality of access requests comprise a plurality of requests to access said data processing system resource utilizing said, bus.

9. The system of claim 6, wherein said latency time period associated with said prior access request comprises a time period utilized to process said prior access request.

10. The system of claim 6, wherein said data processing system resource comprises a data processing system memory element, and said prior access request comprises access requests immediately preceding said current access request in time.

11. A computer program product for managing power usage within a data processing system resource coupled with a power-managed server data processing system via a bus, said computer program product comprising:
- a computer-readable storage media;
- first program instructions for processing a plurality of access requests associated with said bus;
- second program instructions for determining a processing latency time period associated with a prior access request of said plurality of access requests;
- third program instructions for inhibiting processing of a current access request for a power management delay time period, wherein said power management delay time period is determined utilizing said processing latency time period, and wherein said data processing system resource comprises a data processing system input/output element, and said power management delay time period is determined utilizing an average processing latency time period associated with a predetermined number of access requests of said plurality of access requests preceding said current access request in time;
- fourth program instructions for causing data specifying a power management level to be stored utilizing a storage element associated with said power-managed server data processing system; and
- fifth program instructions for inhibiting said processing of said current access request in response to said causing, and wherein said first, second, third, fourth and fifth program instructions are stored on said computer readable storage media.

12. The computer program product of claim 11, wherein said power-managed server data processing system comprises one of a plurality of server data processing systems, and wherein said computer program product further comprises:
- sixth program instructions for determining said data specifying said power management level in response to a receipt of a first power management command local to said power-managed server data processing system and a second power management command from a power management server data processing system of said plurality of server data processing systems.

13. The computer program product of claim 11, wherein said plurality of access requests comprise a plurality of requests to access said data processing system resource utilizing said bus.

14. The computer program product of claim 11, wherein said latency time period associated with said prior access request comprises a time period utilized to process said prior access request.

15. The computer program product of claim 11, wherein said data processing system resource comprises a data processing system memory element, and said prior access request comprises access requests immediately preceding said current access request in time.

* * * * *

UNITED STATES PATENT AND TRADEMARK OFFICE
CERTIFICATE OF CORRECTION

| | |
|---|---|
| PATENT NO. | : 7,664,968 B2 |
| APPLICATION NO. | : 11/148580 |
| DATED | : February 16, 2010 |
| INVENTOR(S) | : Bahali et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 442 days.

Signed and Sealed this

Seventh Day of December, 2010

David J. Kappos
*Director of the United States Patent and Trademark Office*